United States Patent Office 2,695,376
Patented Nov. 23, 1954

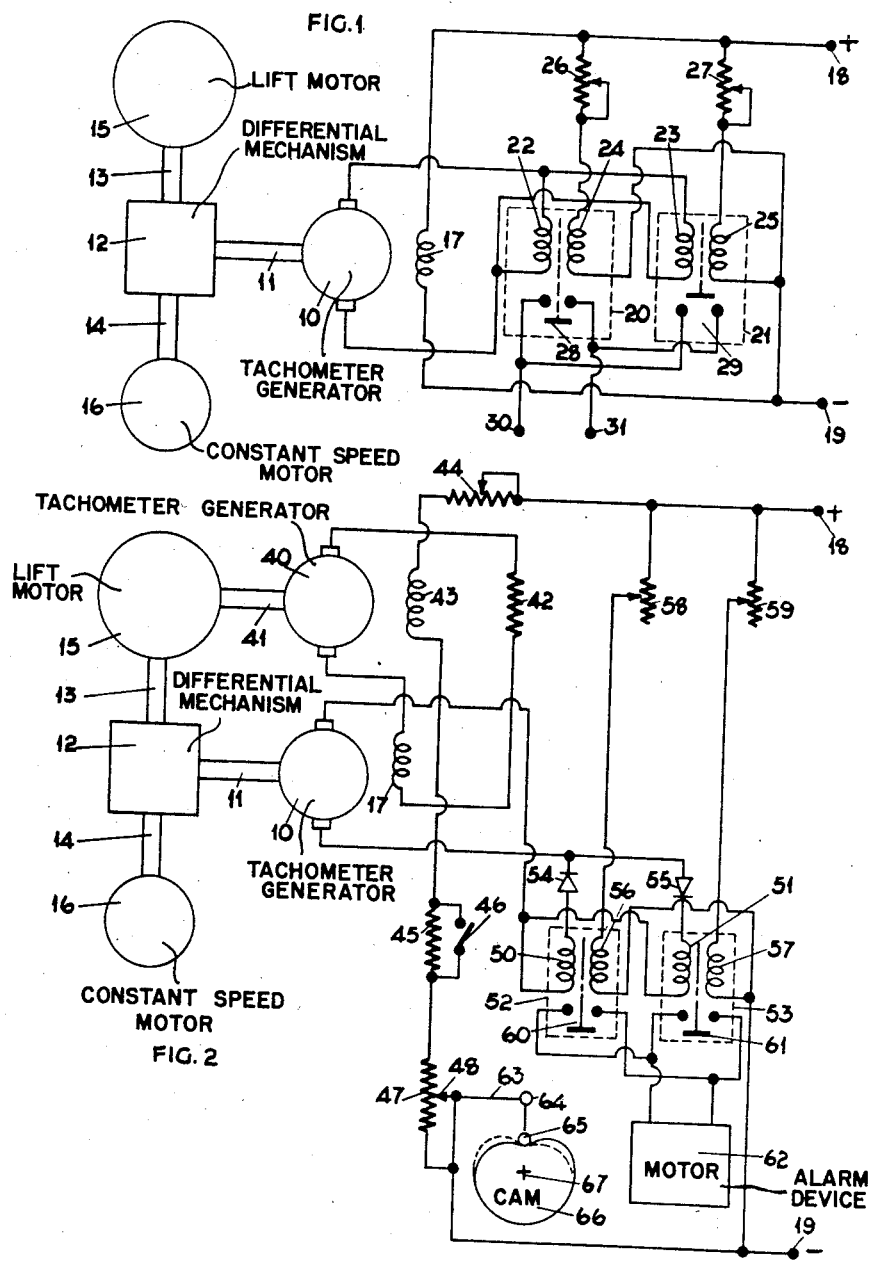

2,695,376

TACHOMETER DEVICE AND CONTROL SYSTEM, INCLUDING SUCH DEVICES

Sydney Albert George Emms, Leamington Spa, and Bruce Sydney Pelton, Solihull, England, assignors to The General Electric Company Limited, London, England, a British company Application June 24, 1952, Serial No. 295,292

Claims priority, application Great Britain June 28, 1951

8 Claims. (Cl. 317—5)

The present invention relates to tachometer devices and control systems including such devices and may be applied for example to lifts, winders and the like, though it is also applicable to other arrangements in which it is necessary to give an indication of the speed of rotation of a shaft which may, if desired, be driven at a speed dependent upon the linear speed of a moving element.

In known forms of tachometer device comprising an electric generator producing either direct current or alternating current difficulty is experienced in maintaining accurate indications of speed, particularly at slow and very slow speeds, owing to the low frequency of the ripple produced by the commutator of a direct current generator or the low frequency of the alternating current output of an alternating current generator. This difficulty is especially pronounced in the case of winders and lifts for example in which it is necessary to determine with considerable accuracy the speed of movement of the lift or winder cage especially towards the end of its travel where the speed is a fraction of the maximum speed so that with normal forms of tachometer comprising an electric generator driven in accordance with the speed of the lift or winder, the output of the generator is very small. In addition to permitting accurate determination of the speed of movement at slow speeds it may also be necessary to provide accurate indication of speed throughout the speed range of the lift or winder so as to ensure that predetermined speeds are not exceeded.

According to the present invention a tachometer device comprises a shaft arranged to be rotated at a speed dependent upon the speed to be measured, a second shaft arranged to be driven at a predetermined speed, and an electric generator coupled to said two shafts through a differential mechanism whereby said generator is arranged to be driven at a speed dependent upon the speeds of said shafts.

Preferably, the speeds of the two shafts and the differential mechanism are such that the electric generator is arranged to rotate when the first shaft is rotated at any speed, from standstill to the maximum speed inclusive. In order to obtain this condition where the first shaft may be rotated in either direction, the speed of rotation of the second shaft may be arranged to be greater than the maximum speed of rotation of the shaft rotated at a speed dependent upon the speed to be measured so that while the second shaft is being rotated the tachometer will be driven always in one direction at a speed varying between the sum of the speeds of the two shafts and the difference of the speeds of the two shafts, assuming that the differential mechanism provides unity speed ratio between the two driving shafts and the electric generator. If, however, the first shaft is only arranged to rotate in one direction, the direction of rotation of the second shaft and the arrangement of the differential mechanism may be arranged so that they are additive so that the generator is driven at a speed which varies between the speed of rotation of the second shaft and the sum of the speeds of the two shafts if the differential mechanism has unity ratio.

By ensuring that the electric generator is rotated throughout the speed range of the first shaft it is possible to avoid the low speed range of the electric generator so that it, under all conditions, gives an appreciable output which enables the speed to be determined accurately. In the case of a D. C. generator not only can the tachometer generator be arranged to produce an appreciable voltage output at all speeds of rotation of the first shaft, but also the commutator ripple produced by the generator can be arranged to be negligible in relation to the output voltage. In the case of an A. C. tachometer generator the frequency of the alternating current output can be prevented from approaching zero so that the alternating current output can be fed through transformers or other devices without excessive saturation and the output from the alternating current tachometer generator can be rectified and smoothed if desired without extreme difficulty.

The second shaft of the tachometer device can be arranged to be driven at a constant speed by means of a constant speed motor such, for instance, as a synchronous motor, or if desired, the speed can be adjusted to a predetermined constant speed by adjustment of the speed of a variable speed motor. In certain circumstances, however, it may be desirable to make provision for varying the speed of the second shaft in a predetermined manner so that the speed at which the electric generator is driven varies with the speed of the first shaft and also varies with the speed of the second shaft.

Two forms of control system in accordance with the present invention as applied to the control of a winder to cause the application of emergency brakes or the sounding of an alarm in the event of the speed of the winder exceeding a safe value will now be described by way of example with reference to the accompanying drawings in which Figure 1 shows a circuit diagram of one arrangement; and Figure 2 shows a circuit diagram of a second embodiment incorporating refinements to increase the sensitivity.

In the arrangement shown in Figure 1, a direct current tachometer generator 10 is arranged to be driven by a shaft 11 from a differential mechanism 12 having two input shafts 13 and 14 respectively. The input shaft 13 is coupled to the shaft of a main motor 15 for driving the winder while the shaft 14 is coupled to a motor 16 which is arranged to rotate at a constant speed and may for example be a synchronous alternating current motor. The differential mechanism 12 is arranged to provide the same speed ratio between the shaft 13 and the shaft 11 as between the shaft 14 and the shaft 11, these ratios being, for example, 1:1. The speed of the shaft 14 is arranged to be greater than the maximum speed of the shaft 13 in either direction and may for instance be of the order of twice the maximum speed of the shaft 13. According to the direction of rotation of the first shaft 13 the tachometer generator 10 will be driven at a speed greater or less than the speed of the second shaft 14 so that the electrical output from the tachometer generator 10 will vary with the speed of the main motor 15 and moreover the tachometer generator will always be driven in one direction so that for all speeds of the winder motor 15 it produces an electrical ouput. In the arrangement shown the tachometer generator 10 has a separately excited field winding 17 arranged to be supplied from a constant voltage direct current supply connected to terminals 18 and 19.

The voltage output from the tachometer generator 10 is compared with a reference voltage to determine whether or not the speed of the winder motor 15 is greater or less than a value or values for which a reference voltage or voltages is or are set. The control arrangement includes two polarised relays 20 and 21 having their operating windings 22 and 23 respectively connected in parallel across the output from the tachometer generator 10. The relays also have biasing windings 24 and 25 respectively which are arranged to be fed through variable resistances 26 and 27 respectively from the constant voltage direct current supply connected to the terminals 18 and 19. The relay 20 has normally open contacts 28, these contacts being arranged to close when the output voltage from the tachometer generator 10 exceeds a predetermined value dependent upon the setting of the variable resistance 26. The second polarised relay 21 has normally open contacts 29 which are arranged to close when the voltage output from the tachometer generator 10 falls below a predetermined value dependent upon the setting of the variable resistance 27. The contacts 28 and 29 are connected in parallel to terminals 30 and 31 which may be connected in a control circuit (not shown) for sounding an alarm or giving some other indication of overspeed or for effecting a controlling action to reduce the speed of the winder motor 15 by applying emergency brakes or otherwise. It will be appreciated that the variable resistance 26 is set at an appropriate value to determine the maximum speed of rotation of the motor 15 in one direction in which the speed of the shaft 13 is added by the differential device 12 to the speed of the shaft 14. Similarly the setting of the variable resistance 27 determines the maximum speed of the motor 15 in the opposite direction in which the speed of the shaft 13 is subtracted by the differential device 12 from the speed of the shaft 14.

The arrangement shown in Figure 2 provides greater sensitivity than that shown in Figure 1 and also provides additional facilities. In this arrangement the tachometer generator 10 is arranged to be driven as before through a shaft 11 from the differential device 12 having input shafts 13 and 14 which are connected to the main winder motor 15 and to a constant speed synchronous motor 16 respectively. In this arrangement, however, the field winding 17 of the tachometer generator 10 is arranged to be fed with the output from a second tachometer generator 40 coupled by a shaft 41 to the main motor 15. A ballast resistance 42 is connected in the circuit between the second tachometer generator 40 and the field winding 17 so as to swamp variations in resistance due to change of ambient temperature. The second tachometer generator 40 has a separately excited field winding 43 which is arranged to be supplied from the constant voltage direct current supply connected to the terminals 18 and 19 through an adjusting resistance 44, a resistance 45 which may be short-circuited by a switch 46 and a variable resistance 47 having a slider 48, the position of which can be controlled by mechanism as described hereafter. It will be observed that the excitation of the tachometer generator 10 is made dependent upon the speed of the main winder motor 15 and that the sense of the output voltage of the tachometer generator 10 will depend upon the direction of rotation of the main winder motor 15. The operating windings 50 and 51 of two relays 52 and 53 respectively are connected through rectifiers 54 and 55 respectively across the output from the tachometer generator 10. The relays 52 and 53 also have polarising windings 56 and 57 respectively arranged to be fed through variable resistances 58 and 59 respectively from the constant voltage direct current supply connected to the terminals 18 and 19. The relays 52 and 53 have normally open contacts 60 and 61 which are connected in parallel to an alarm device 62.

The slider 48 of the variable resistance 47 is mounted on an arm 63 pivoted at 64 and having a follower 65 arranged to follow a cam profile 66 which is rotatable about an axis 67 in dependence upon the position of the winder cage in the shaft. The profile of a cam such as 66 for movement of the winder in one direction is shown in full lines while the corresponding profile for movement in the opposite direction is shown partly by dotted lines in Figure 2. The cam follower 65 is arranged to be moved automatically from one profile to the other upon change of direction of rotation of the winder motor 15. The arrangement is such that movement of the slider 48 by the cam mechanism in dependence upon the position of the winder cage in the shaft alters the strength of excitation of the field winding 43 of the second tachometer generator 40 so that a speed/space relationship is established. This speed/space relationship can be altered when men are to be carried in the winder cage by closing the switch 46 to short circuit the resistance 45 thereby increasing the excitation of the field winding 43 of the second tachometer generator 40 and in consequence increasing the excitation of the field winding 17 of the first tachometer generator 10. The normally open contacts 60 of the relay 52 are arranged to close if the speed of rotation of the main motor 15 exceeds a predetermined value which depends inter alia upon the position of the slider 48. Similarly the normally open contacts 61 of the relay 53 close if an excessive speed of the main winder motor 15 is reached in the opposite direction. Owing to the provision for varying the field excitation of the second tachometer generator 40 by means of the variable resistance 47 the emergency brakes of the winder can be arranged to be brought into operation at different speeds according to the position of the winder cage in the shaft. To ensure that the cage is brought to rest at bank at either end of its travel the control system is preferably such that the emergency brakes are brought into operation at a progressively decreasing speed of the winder towards each end of the travel of the winder, a higher maximum speed being permitted during intermediate parts of the wind. The desired relationship between the speed of the winder and the position of the cage can be obtained by suitable shaping of the profile of the cam 66 so that the slider 48 of the variable resistance 47 is moved to increase the excitation of the field winding 43 of the second tachometer generator 40 when the permitted speed is to be reduced.

In an alternative arrangement in accordance with the present invention which may be applied especially where the first shaft does not reverse its direction of rotation the voltage output of the tachometer generator may be compared wih a fixed reference potential and the speed of the second shaft adjusted to a predetermined value in order to set up the system so that the voltage output of the tachometer generator equals the reference potential at a pre-arranged speed of the first shaft.

We claim:

1. A tachometer device comprising a first shaft, means for driving the first shaft at a speed dependent upon a speed to be measured, a second shaft, means for driving the second shaft at a predetermined speed, a differential mechanism having driving members driven by said first and second shafts and having a driven member driven at the algebraic sum of the speeds of the first and second shafts, and an electric generator driven by the driven member, the predetermined speed of the second shaft being greater than the speed of the first shaft in either direction so that throughout the range of speed of the first shaft the speed of the generator does not reach zero.

2. A tachometer device comprising a first shaft, means for driving the first shaft at a speed dependent upon a speed to be measured, a second shaft, means for driving the second shaft at a predetermined constant speed greater than the speed of the first shaft in either direction of rotation, a differential mechanism having driving members driven by said first and second shafts and having a driven member driven at the algebraic sum of the speeds of the first and second shafts, a direct current electric generator driven by the driven member, an electrical reference source and connections from said generator and said source to means for comparing an electrical output quantity from the generator with an electrical reference quantity and for indicating when the electrical output quantity departs from a specified range of values.

3. A tachometer device according to claim 2, wherein the means for comparing the electrical output quantity from the generator with an electrical reference quantity comprises a relay having an operating winding to which the electrical output from the generator is applied and a polarizing winding fed with a predetermined current.

4. A tachometer device according to claim 3, comprising regulator means connected to the polarizing winding for adjusting the polarizing current to a desired value.

5. A tachometer device comprising a first shaft, means for driving the first shaft at a speed dependent upon a speed to be measured, a second shaft, means for driving the second shaft at a predetermined constant speed greater than the speed of the first shaft in either direction of rotation, a differential mechanism having driving members driven by said first and second shafts and having a driven member driven at the algebraic sum of the speeds of the first and second shafts, a direct current electric generator driven by the driven member, an excitation supply for said generator, means connected to the excitation supply for varying the excitation of the generator, an electrical reference source, and connections from said generator and said source to means for comparing an electrical output quantity from the generator with an electrical reference quantity and for indicating when the electrical output quantity departs from a specified range of values.

6. A tachometer device comprising a first shaft, means for driving the first shaft at a speed dependent upon a speed to be measured, a second shaft, means for driving the second shaft at a predetermined constant speed greater than the speed of the first shaft in either direction of rotation, a differential mechanism having driving members driven by said first and second shafts and having a driven member driven at the algebraic sum of the speeds of the first and second shafts, a direct current electric generator driven by the driven member, a second direct current electric generator, said second generator being driven by said first shaft and providing an excitation supply for the first mentioned direct current electric generator, said excitation being dependent upon the speed of rotation of said first shaft, an electrical reference source, and connection from said generator driven by the driven member and from said reference source to means for comparing an electrical output quantity from the generator driven by the driven member with an electrical reference quantity and for indicating when the electrical output quantity departs from a specified range of values.

7. A tachometer device comprising a first shaft, means for driving the first shaft at a speed dependent upon a speed to be measured, a second shaft, means for driving the second shaft at a predetermined constant speed greater than the speed of the first shaft in either direction of rotation, a differential mechanism having driving members driven by said first and second shafts and having a driven member driven at the algebraic sum of the speeds of the first and second shafts, a direct current electric generator driven by the driven member, a second electric generator, said second generator being driven by said first shaft and providing an excitation supply connected to the first mentioned direct current electric generator, said excitation being dependent upon the speed of rotation of said first shaft, an excitation supply connected to said second electric generator, means connected to the excitation supply for said second generator for varying the excitation of said second generator in a predetermined manner, an electric reference source and connections from said generator driven by the driven member and from said reference source to means for comparing an electrical output quantity from the generator with an electrical reference quantity and for indicating when the electrical output quantity departs from a specified range of values.

8. A tachometer device according to claim 7, comprising means responsive to the position of an article the speed of which is to be measured and means connected to the excitation supply for said second electric generator for varying the excitation of the second electric generator in dependence upon the position of said article.

References Cited in the file of this patent

UNITED STATES PATENTS

| Number | Name | Date |
| --- | --- | --- |
| 1,111,345 | Wood | Sept. 22, 1914 |
| 1,487,012 | Chireix | Mar. 18, 1924 |
| 2,246,516 | Herzog | June 24, 1941 |
| 2,447,208 | Rendel | Aug. 17, 1948 |

FOREIGN PATENTS

| Number | Country | Date |
| --- | --- | --- |
| 58,796 | Sweden | Nov. 2, 1920 |